(12) United States Patent
Mathai et al.

(10) Patent No.: US 10,776,851 B2
(45) Date of Patent: Sep. 15, 2020

(54) UI COMPARISON TOOL

(75) Inventors: Jackson Mathai, Heidelberg (DE); Heinz Willumeit, Wiesloch (DE)

(73) Assignee: SAP SE, Walldorf (DE)

( * ) Notice: Subject to any disclaimer, the term of this patent is extended or adjusted under 35 U.S.C. 154(b) by 1783 days.

(21) Appl. No.: 13/526,012

(22) Filed: Jun. 18, 2012

(65) Prior Publication Data

US 2013/0339897 A1 Dec. 19, 2013

(51) Int. Cl.

| | | |
|---|---|---|
| *G06F 3/048* | (2013.01) | |
| *G06Q 30/06* | (2012.01) | |
| *G06F 3/023* | (2006.01) | |
| *G06F 3/01* | (2006.01) | |
| *G06F 17/24* | (2006.01) | |
| *G06F 3/0481* | (2013.01) | |

(52) U.S. Cl.
CPC ....... *G06Q 30/0629* (2013.01); *G06F 3/0237* (2013.01); *G06F 3/0481* (2013.01); *G06F 17/243* (2013.01)

(58) Field of Classification Search
CPC .......... H04L 29/0809; H04L 29/08072; G06F 17/30873; G06F 17/30899; G06Q 30/02

USPC ........................................................ 715/738
See application file for complete search history.

(56) References Cited

U.S. PATENT DOCUMENTS

| | | | |
|---|---|---|---|
| 7,237,187 B2* | 6/2007 | Neal et al. .................... | 715/273 |
| 7,792,849 B2* | 9/2010 | Anderson et al. ............ | 707/758 |
| 8,264,502 B2* | 9/2012 | Wang et al. .................. | 345/619 |
| 2003/0145277 A1* | 7/2003 | Neal et al. .................... | 715/509 |
| 2006/0090143 A1* | 4/2006 | Tanaka .......................... | 715/810 |

* cited by examiner

*Primary Examiner* — Nicholas Augustine (74) *Attorney, Agent, or Firm* — Mintz Levin Cohn Ferris Glovsky and Popeo, P.C.

(57) ABSTRACT

Methods and apparatus, including computer program products, are provided for comparing aspects of a user interface. In some implementations there is provided a method. The method including receiving data from a first business object and a second business object; generating a single user interface to include a first data field and a second data field, the first and second data fields having the same context; and inserting from the data from the first business object and the second business object into the first and second data fields having the same context to enable comparison of the data. Related systems, methods, and articles of manufacture are also provided.

14 Claims, 7 Drawing Sheets

Table BO 1

| Add Row | Remove | Check Availability | Assign Source of Supply | Release E | Discou |
| --- | --- | --- | --- | --- | --- |
| Line | ATP | Product ID | Quantity | List Price | |
| 10 | | AXUS-S661 - Project M( | 6 ea | 15,000.00 USD | |
| 20 | | AXUS-S662 - Senior Co | 120 h | 281.00 USD | |

510

Table BO 2

| Add Row | Remove | Check Availability | Assign Source of Supply | Release Ex | Discount |
| --- | --- | --- | --- | --- | --- |
| Line | ATP | Product ID | Quantity | List Price | (% |
| 10 | | AXUS-S662 - Senior Co | 100 h | 100.00 USD | |
| 20 | | AXUS-S664 - Junior Co | 50 h | 120.00 USD | |
| 40 | | AXUS-S795 - Travel En | 1 act | 25,000.00 USD | |
| 50 | | AXUS-S661 - Project M( | 10 ea | 120.00 USD | |

520

Key-ID = „Product ID"

UI COMPARISON TOOL

FIELD

The present disclosure generally relates to data processing and, in particular, user interfaces.

BACKGROUND

Various organizations make use of enterprise resource planning (ERP) software architectures to provide an integrated, computer-based system for management of internal and external resources, such as for example tangible assets, financial resources, materials, customer relationships, and human resources. In general, an ERP software architecture is designed to facilitate the flow of information between business functions inside the boundaries of the organization and manage the connections to outside service providers, stakeholders, and the like. Such architectures often include one or more centralized databases accessible by a core software platform that consolidates business operations, including but not limited to those provided by third party vendors, into a uniform and organization-wide system environment. The core software platform can reside on a centralized server or alternatively be distributed across modular hardware and software units that provide "services" and communicate on a local area network or over a network, such as for example the Internet, a wide area network, a local area network, or the like.

As part of the installation process of the core software platform on computing hardware owned or operated by the organization, one or more customized features, configurations, business processes, or the like may be added to the default, preprogrammed features such that the core software platform is configured for maximum compatibility with the organization's business processes, data, and the like.

The core software platform of an ERP software architecture can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available ERP solution to work with organization-specific business processes and functions is feasible. Smaller organizations can also benefit from use of ERP functionality. However, such an organization may lack the necessary hardware resources, IT support, and/or consulting budget necessary to make use of a standalone ERP software architecture including on-premises components. As such, the organization can in some cases be more effectively served by an on-demand system or component, such as a software as a service (SaaS) arrangement in which the ERP system architecture is hosted on computing hardware such as servers and data repositories that are maintained remotely from the organization's location and accessed on-demand by authorized users at the organization via a thin client, such as for example a web browser, over a network.

SUMMARY

Methods and apparatus, including computer program products, are provided for comparing aspects of a user interface. In some implementations there is provided a method. The method including receiving data from a first business object and a second business object; generating a single user interface to include a first data field and a second data field, the first and second data fields having the same context; and inserting from the data from the first business object and the second business object into the first and second data fields having the same context to enable comparison of the data. Related systems, methods, and articles of manufacture are also provided.

In some implementations, the above-noted aspects may further include additional features described herein including one or more of the following. The same context may comprise arranging the first data field adjacent to the second data field. The same context may comprise structuring the single user interface to present the first data field and the second data field in a manner similar to another user interface presenting the first data field without the second data field. The single user interface may highlight when there is a difference between the first data field and the second data field presented at the single user interface. The first business object may comprise a data structure from a software-as-a-service system. The page may be generated to include the first and second data fields having the same context to enable comparison of the data.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Like labels are used to refer to same or similar items in the drawings.

DETAILED DESCRIPTION

In a service oriented architecture (SOA), such as for example a SaaS-based enterprise resource planning application, the basis of a user interface (UI) presented to a client, such as a thin client, can be a business object (BO). The BO for each UI can be defined based on a specific business use or configuration of the organization (or user to which the UI corresponds). In instances in which multiple organizations or discrete users (hereinafter referred to generally as "users") share core functionality of a service oriented architecture with the ability to customize user-specific functionality, particularly via a UI with one or more user-specific aspects or features, each customized feature or aspect for each user can require its own one or more business objects. Thus, several business objects can be used to perform tasks typically performed via a single UI.

Figure 1:
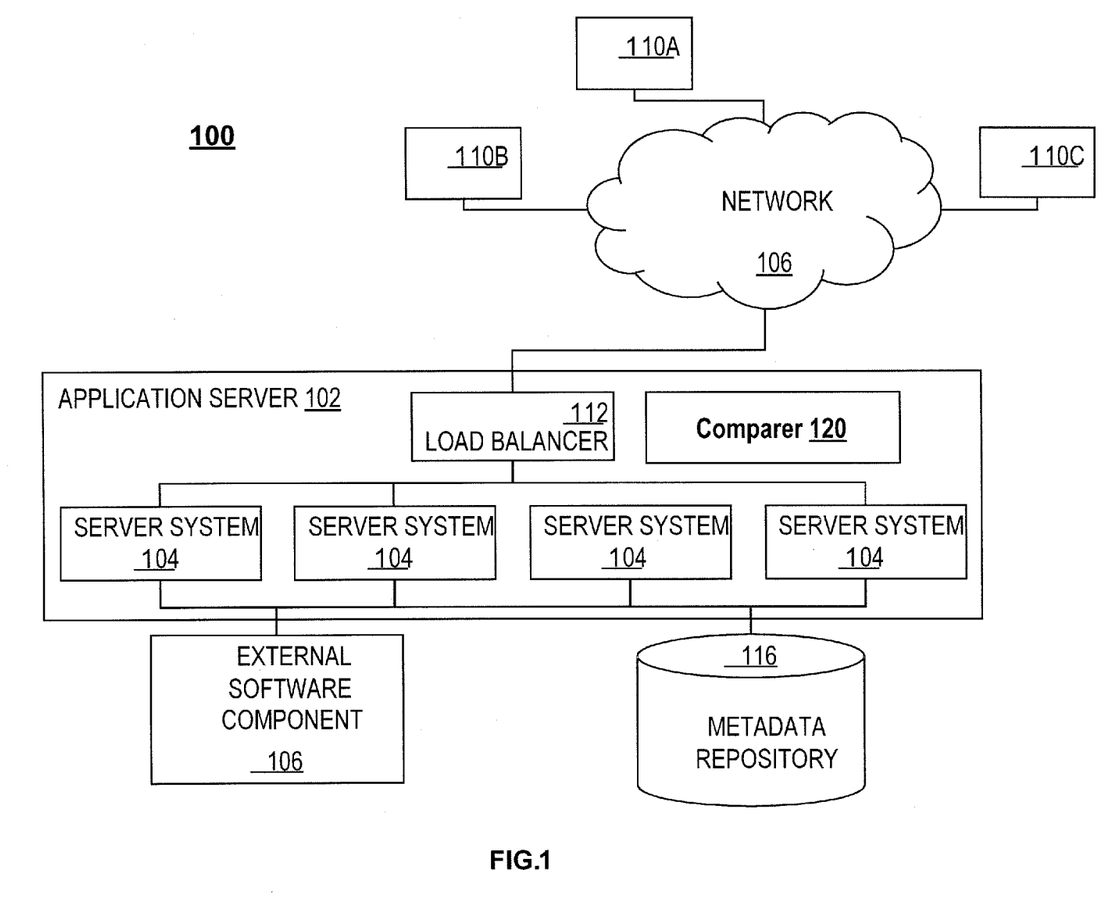
FIG. 1 depicts an example of a cloud-based system 100 configured to perform user interface (UI) comparisons, in accordance with some exemplary implementations.

FIG. 1 shows a block diagram of a multi-tenant implementation of a software delivery architecture 100 that includes an application server 102, which can in some implementations include multiple server systems 104 that are accessible over a network 106 from client machines operated by users at each of multiple organizations 110A-110C (referred to herein as "tenants" of a multi-tenant system) supported by a single software delivery architecture 100. For a system in which the application server 102 includes multiple server systems 104, the application server can include a load balancer 112 to distribute requests and actions from users at the one or more organizations 110A-110C to the one or more server systems 104. A user can access the delivery architecture across the network using a thin client, such as for example a web browser or the like, or other portal software running on a client machine. The application server 102 can access data and data objects stored in one or more data repositories 116. The application server 102 can also serve as a middleware component via which access is provided to one or more external software components 106 (e.g., public solutions) that can be provided by third party developers.

System 100 may also include a comparer 120 to compare structured data content, such as the content form a plurality of business objects, in a single UI rather than use a plurality of windows, views, UI, and the like.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 102 that includes multiple server systems 104 that handle processing loads distributed by a load balancer 112. Potential benefits from such an arrangement can, in some implementations, include, high and reliably continuous application server availability and minimization of unplanned downtime, phased updating of the multiple server systems 304 to permit continuous availability (one server system 104 can be taken offline while the other systems continue to provide services via the load balancer 112), scalability via addition or removal of a server system 104 that is accessed via the load balancer 112, and de-coupled lifecycle processes (such as for example system maintenance, software upgrades, etc.) that enable updating of the core software independently of tenant-specific customizations implemented by individual tenants.

As in the example illustrated in FIG. 1, the metadata repository 116 can store a business object that represents a template definition of a standard business process. Each individual tenant 110A-110C can customize that standard template according to the individual business process features specific to a business of the organization to which that tenant is assigned. Customizations can be stored as extensions in the metadata repository.

Figure 2:
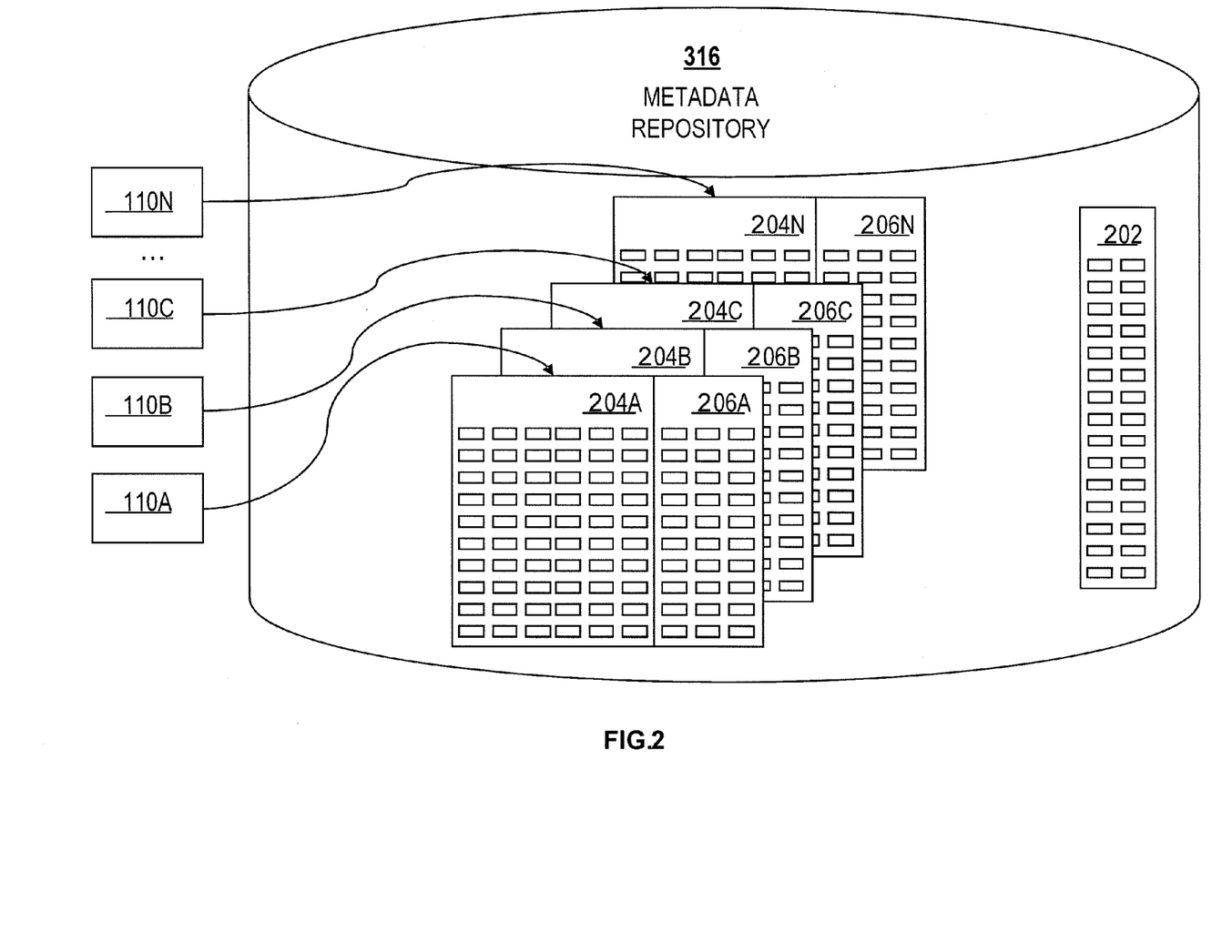
FIG. 2 depicts a data repository implemented to include core software platform content, system content, and tenant content, in accordance with some exemplary implementations.

To provide for customization of the business process for each of multiple organizations supported by a single software delivery architecture 100, the data and data objects stored in the metadata repository 116 and/or other data repositories that are accessed by the application server 102 can include three types of content as shown in FIG. 2: core software platform content 202 (e.g. a standard definition of a business process), system content 204, and tenant content 206.

Core software platform content 202 may include content that represents core functionality and is not modifiable by a tenant.

System content 204 can in some examples be created by the runtime of the core software platform and can include core data objects that store concrete data associated with specific instances of a given business process and that are modifiable with data provided by each tenant. The data retained in these data objects are tenant-specific: for example, each tenant 110A-110N can store information about its own inventory, sales order, etc.

Tenant content 206A-206N may includes data objects or extensions to other data objects that are customized for one specific tenant 110A-110N to reflect business processes and data (e.g., business objects) that are specific to that specific tenant and are accessible only to authorized users at the corresponding tenant. Such data objects can include a key field (for example "client" in the case of inventory tracking) as well as one or more of master data, business configuration information, transaction data, or the like. For example, tenant content 206 can reflect tenant-specific modifications or changes to a standard template definition of a business process as well as tenant-specific customizations of the business objects that relate to individual process step (e.g. records in generated condition tables, access sequences, price calculation results, other tenant-specific values, or the like).

To provide a customized UI, the various elements of a UI, which can be tables, text, images, graphics, dynamic applets, or the like, may draw from, or have a dependency on, several underlying business objects drawn from one or more service providers. In the example of a multi-tenant software delivery architecture such as is depicted in FIG. 1 and FIG. 2 and described above, presentation of each of the business objects can include one or more of core software platform content 202, system content 204, and tenant content 206 drawn from the one or more repositories, such as metadata repository 116.

In some implementations, it may be considered generally advantageous for a UI to access a single business object (BO) as an entry point for a model, or definition, of the UI. A business object can be a data object that reflects aspects of a specific business configuration for users of a system. For a hierarchical user interface model, all nodes of the BO or BOs upon which a UI model relies can be reachable via associations starting from a root node of a BO that is assigned to a root node of the UI model. An existing approach to this issue is the use of so-called controller objects (COs) or enhanced controller objects (ECOs) to aggregate multiple underlying BOs that are relied upon to produce a UI. A CO or an ECO, which is defined at design time, can define a BO with nodes and associations that are mapped from nodes and associations of several other data objects or BOs.

Although business objects are a very useful way to structure data, the technical complexity of business objects/ data structure may make it difficult to make comparisons, especially across a plurality of business objects. Rather than compare the data of two or more business objects by opening two or more UI (or windows) to make a visual comparison, the subject matter disclosed herein generates a single UI structured so that the data in the two or more business objects are adjacent in a single UI. Moreover, the single UI may highlight any differences between data content of the two BOs. Referring again to FIG. 1, the comparer 120 may be implemented to compare the data of two or more BOs by generating a single UI configured to allow a comparison of the data from the two or more BOs. As such, a user can readily compare the data of the two or more business objects in a single UI.

Figure 3:
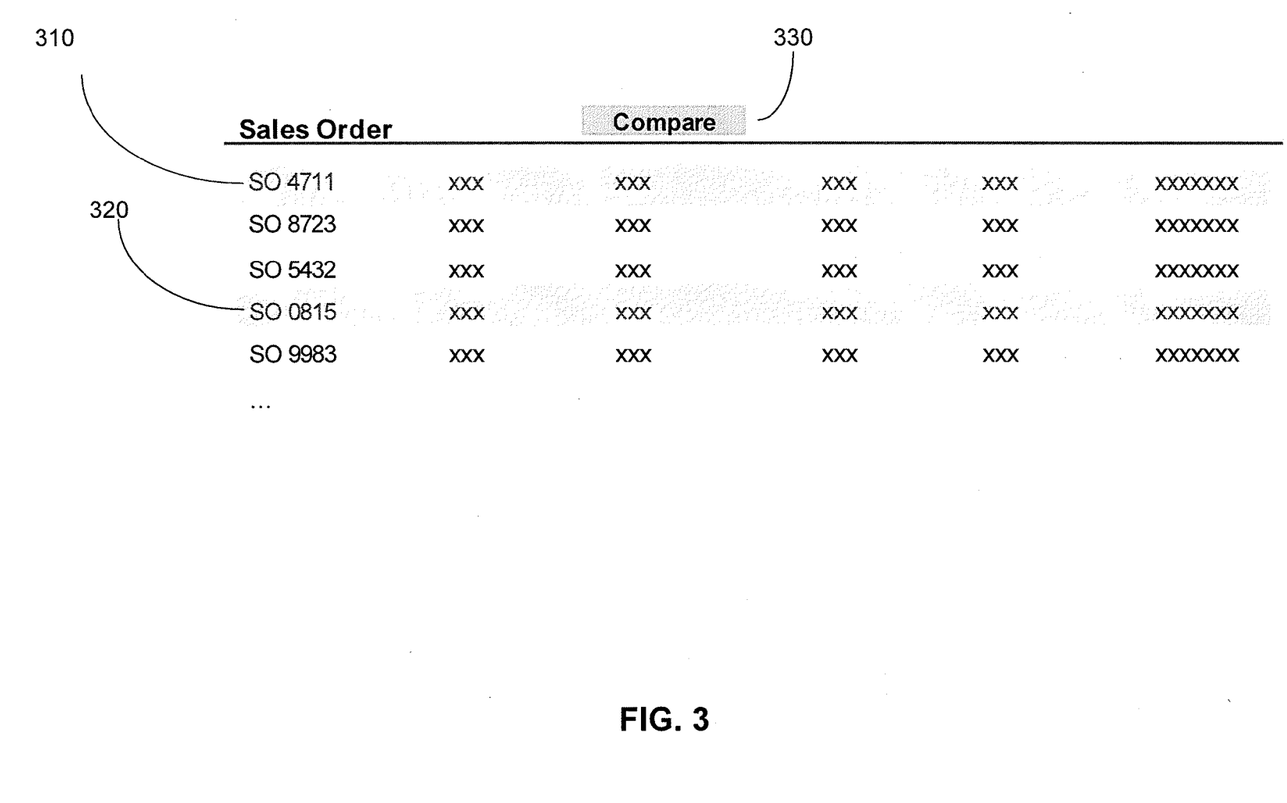
FIG. 3 depicts an example of business objects arranged as rows in a table of sales orders, in accordance with some exemplary implementations.

FIG. 3 depicts examples of business objects corresponding to sales orders, each row of which corresponds to a BO. In the example of FIG. 3, sales orders 310 and 320 each correspond to content in a BO, and sales orders 310 and 320 are selected for handling by the comparer 120. When the compare icon 330 is selected, the comparer 120 generates a single user interface depicting the fields of each sales order (e.g., the data of the underlying business objects) in a manner that allows ready comparison between corresponding fields.

Although the example of FIG. 3 refers to sales orders, this is merely an example as other types of structured data may be used as well. Moreover, although the previous example describes comparer 120 initiating the comparison when the compare icon 330 is selected, other initiation mechanisms may be used as well. For example, sales orders 310 and 320 may be dropped and dragged into an icon for the compare tool 120, or a specific function call, such as a compare function call, can be invoked from within a single-instance screen, thus converting it into a compare-UI.

Figure 4:
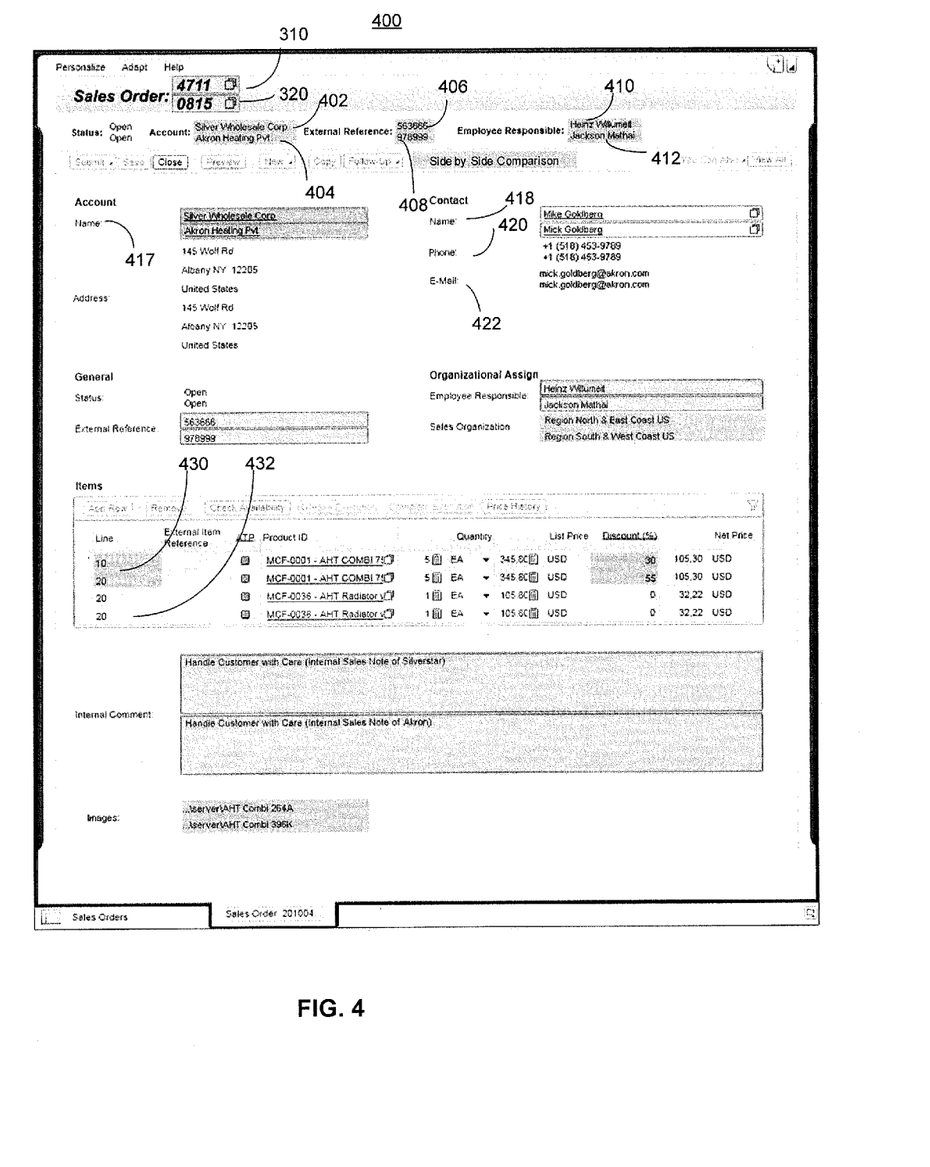
FIG. 4 depicts an example of a UI comparison, in accordance with some exemplary implementations.

FIG. 4 depicts an example of a UI 400 generated by the comparer 120 to compare sales orders 310 and 320, in accordance with some exemplary implementations.

In some implementations, the data content from each of the sales orders (each of which corresponds to a BO) appears in the same context. For example, the data for account appears in the same context, with the first sales order 310 data field 402 (e.g., Silver Wholesale Corp.) appearing next to the second sales order 320 data field 404 (e.g., Akron Hearing Pvt.). The data 406 and 408 for "External Reference" and the data 410 and 412 for "Employee Responsible" also appear in the same context. By placing the data content from the plurality of sales orders (which corresponds to business objects in this example) in the same context as shown in FIG. 4, comparison of the data content is enhanced, when compared to approaches that would this data content in a plurality of user interfaces. For example, by placing the account for the first sales order 310 data field 402 (e.g., Silver Wholesale Corp.) adjacent to the second sales order 320 data field 404 (e.g., Akron Hearing Pvt.), comparison is facilitated using the single UI 400, rather than two windows or two UIs.

FIG. 4 shows other data fields in a compare mode, such as the account name 414, contact name 418, contact phone 420, contact email 422, data items for both sales orders/BO at 430 and 432, and so forth. In essence, FIG. 4 shows that the data being compared appears within the same context (e.g., order, arrangement, and the like) as in a UI presenting the data of just one BO.

The comparer 120 may generate the compare UI 400 of FIG. 4 (which is described further below) at run-time based on a UI model for a single BO, although the comparer 120 may generate UI 400 for other quantities of sales orders and BOs as well. Moreover, the pair wise comparison at UI 400 may be configured to allow changes or edits to the data content of the two sales orders or business objects.

Figure 5A:
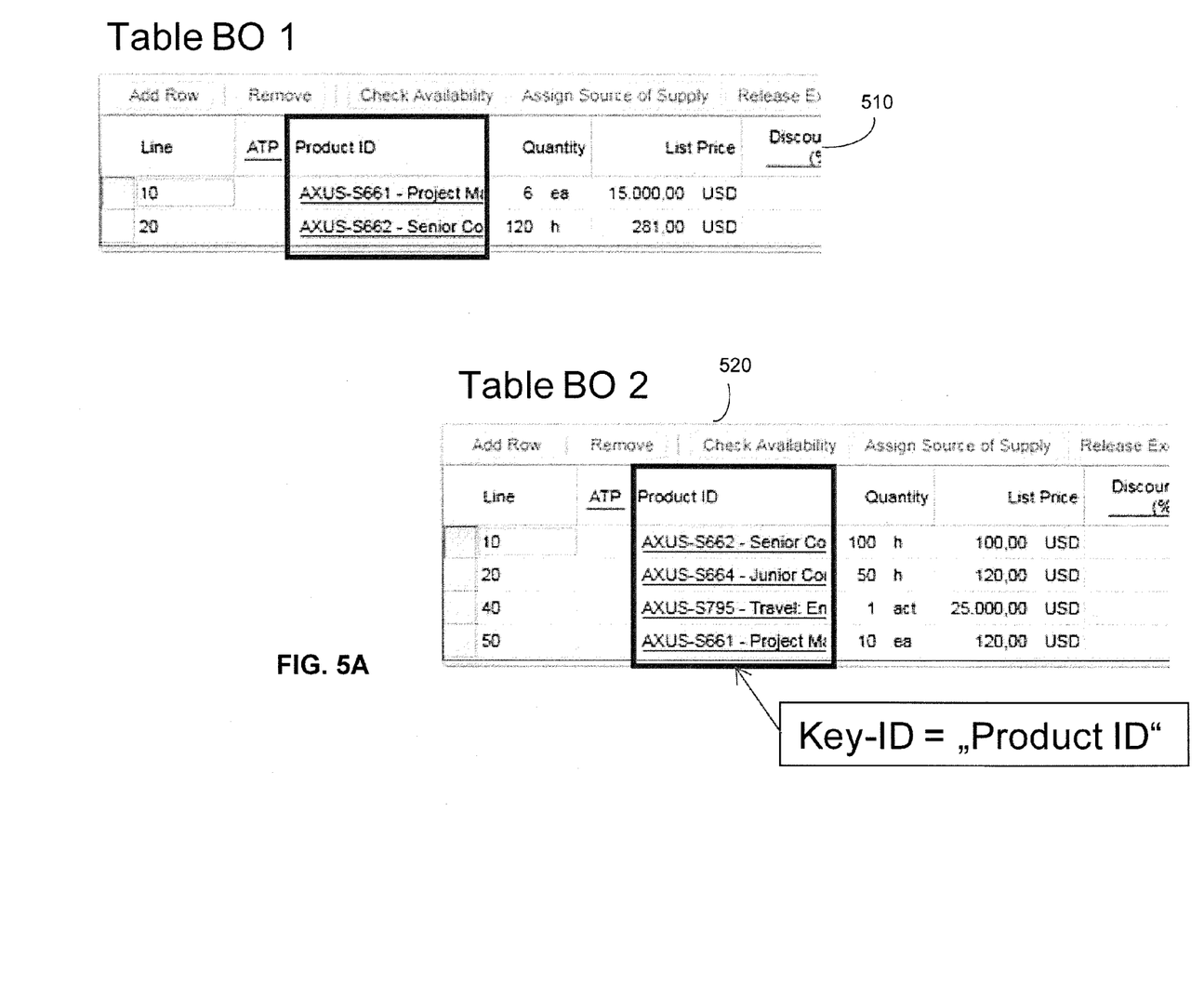
FIG. 5A-5B depict UI comparison examples, in accordance with some exemplary implementations.
Figure 5B:
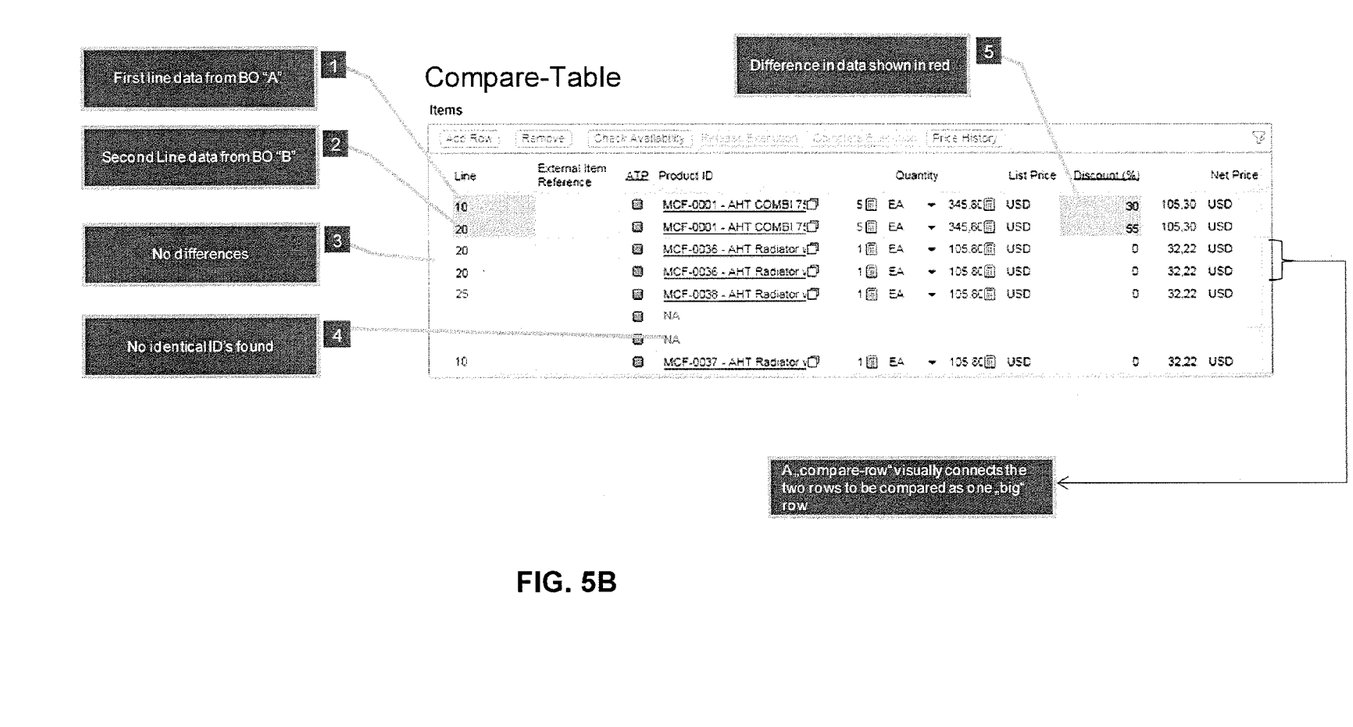

FIG. 5A depicts a first table 510 and a second table 520. In the example of FIG. 5A, a compare-table algorithm is shown to compare tables with Key identifiers (IDs). First, comparer 120 creates a "compare-table," where the first row of table 510 BO1 is on top of the first compare-row. Next, comparer 120 takes an ID from the first row of BO1 510 (e.g. "AXUS-S661") and looks it up across all rows of BO2 520. Next, comparer 120 takes the first match from BO2, marks it as "done" in table of BO2, and puts it at the bottom of the first compare row. Other matches found in table of BO2 (i.e. the same ID is used more than once in the same table) may be ignored at this point. Next, comparer 120 may put the second row of BO1 on top of the second compare row of the compare table, and then take an ID from second row of BO1 and look it up across all rows of BO2. Comparer 120 may ignore rows flagged as "done." The comparer 120 may continue in the same way as described herein with respect to FIG. 5A until the end of table-BO1 or BO2 is reached. For each row in BO1 that has no match in BO2, comparer 120 may put the BO1 row on top of the compare-row and also put a placeholder "N/A" below it. For each row left in BO2 (i.e. table of BO2 is longer than table of BO1), comparer 120 may put a place-holder "N/A" for rows of BO1 on top of the compare-row and also put the BO2-row at the bottom. This results in a compare-table that has the rows of BO1 always on top of the compare-rows but in same sequence, whereas the rows of BO2 are at the bottom of the compare-rows but in an order adapted to BO1 in case there are matches. If there are no matches at all between the two tables, the compare table has as many compare rows as the sum of number of rows of BO1 plus BO2, where the rows of BO1 are in the upper part of the compare table and the rows of BO2 are at the lower part. The two rows put into a "compare-row" are visually connected by removing the horizontal row-border between them, as depicted at FIG. 5B.

Figure 6:
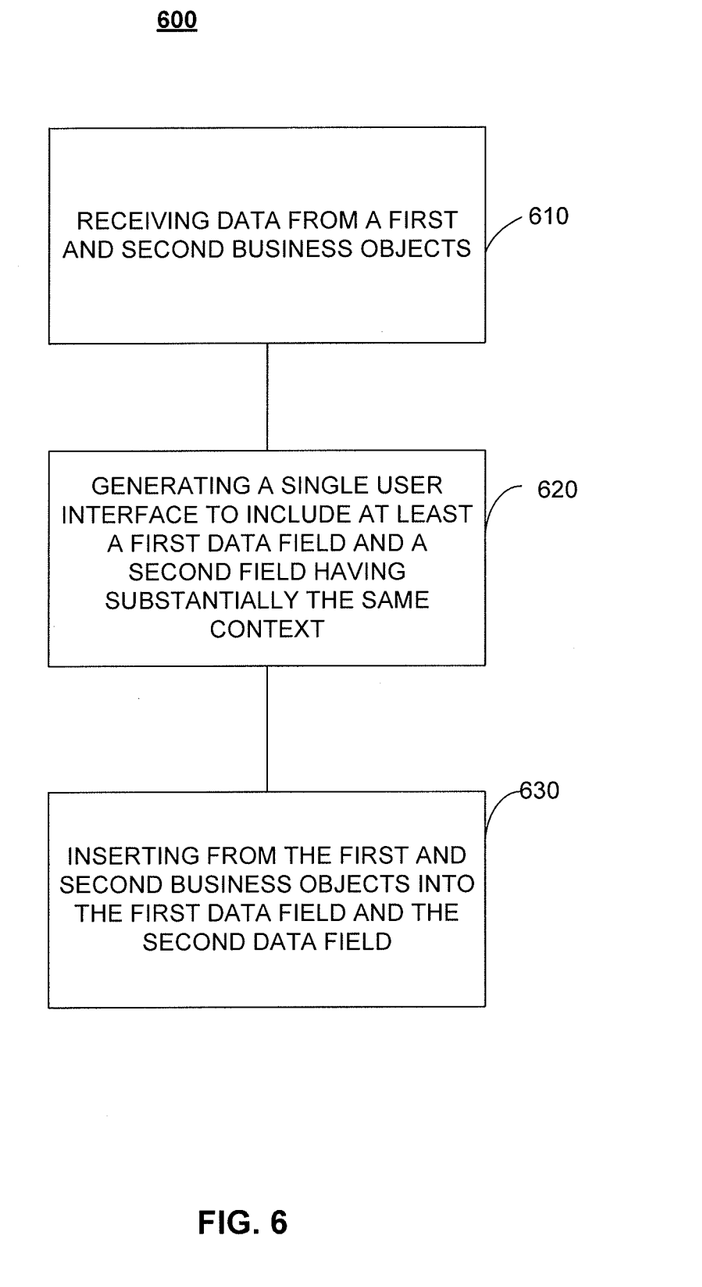
FIG. 6 depicts an example of a process for UI comparisons, in accordance with some exemplary implementations.

FIG. 6 depicts an example of a process 600 for UI comparison, in accordance with some exemplary implementations.

At 610, data may be received from a first and second business objects. For example, the data content for sales orders 310 and 320 may be obtained from business objects stored at system 100. Moreover, the data content may correspond to External Reference 563666 from sales order 310 and External Reference 978999 from sales order 320.

At 620, a single user interface may be generated to include fields having the same context. For example, UI 400 may be generated to include External Reference field 406 and External Reference field 408, and these data fields have the same context as they are arranged adjacent to each other and represent the same type of data.

At 630, data may be inserted into the data fields at the UI having the same context. Referring to the previous UI 400 example from 620, data content 563666 from the first BO (e.g., sales order 310) and data content External Reference 978999 from the second BO (e.g., sales order 320) may be inserted in to External Reference field 406 and External Reference field 408, which have the same context as they are arranged adjacent to each other and represent the same type of data. The inserted data may then be presented at UI 400 to allow comparison.

The example depicted in process 600 is merely exemplary as other data values, business objects, and data content may be used as well.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

Although a few variations have been described in detail above, other modifications are possible. For example, while the descriptions of specific implementations of the current subject matter discuss analytic applications, the current subject matter is applicable to other types of software and data services access as well. Moreover, although the above description refers to specific products, other products may be used as well. In addition, the logic flows depicted in the accompanying figures and described herein do not require the particular order shown, or sequential order, to achieve desirable results. Other embodiments may be within the scope of the following claims.

What is claimed:

1. A computer-readable medium containing instructions to configure at least one processor to perform operations comprising:
   receiving first sales order data from a first business object corresponding to a first sales order and second sales order data from a second business object corresponding to a second sales order, wherein the first data and the second data are a same type of sales order data content;
   creating a compare table to enable a comparison of the first sales order data to the second sales order data;
   generating a single user interface to include the compare table, a first data field, and a second data field, wherein the first data field and the second data field have a same context on the generated single user interface, and wherein the same context comprises having the first data field and the second data field adjacent to each other in the generated single user interface to enable the comparison;
   inserting the first sales order data into the first data field and the second sales order data into the second data field to further enable the comparison; and
   configuring the generated single user interface to allow at least one change to be made, based on the comparison, to the first sales order data and the second sales order data while in the same context.

2. The computer-readable medium of claim 1, wherein the same context comprises structuring the single user interface to present the first data field and the second data field in a manner similar to another user interface presenting the first data field without the second data field.

3. The computer-readable medium of claim 1, wherein the single user interface highlights when there is a difference between the first data field and the second data field presented at the single user interface.

4. The computer-readable medium of claim 1, wherein the first business object comprises a data structure from a software-as-a-service system.

5. A system comprising:
   at least one processor; and
   at least one memory including code which when executed provides operations comprising:
      receiving first sales order data from a first business object corresponding to a first sales order and second sales order data from a second business object corresponding to a second sales order, wherein the first data and the second data are a same type of sales order data content;
      creating a compare table to enable a comparison of the first sales order data to the second sales order data;
      generating a single user interface to include the compare table, a first data field, and a second data field, wherein the first data field and the second data field have a same context on the generated single user interface, and wherein the same context comprises having the first data field and the second data field adjacent to each other in the generated single user interface to enable the comparison;
      inserting the first sales order data into the first data field and the second sales order data into the second data field to further enable the comparison; and
      configuring the generated single user interface to allow at least one change to be made, based on the comparison, to the first sales order data and the second sales order data while in the same context.

6. The system of claim 5, wherein the same context comprises structuring the single user interface to present the first data field and the second data field in a manner similar to another user interface presenting the first data field without the second data field.

7. The system of claim 5, wherein the single user interface highlights when there is a difference between the first data field and the second data field presented at the single user interface.

8. The system of claim 5, wherein the first business object comprises a data structure from a software-as-a-service system.

9. The system of claim 5 further comprising:
   generating a page including the first and second data fields having the same context to enable comparison of the data.

10. A method comprising:
receiving first sales order data from a first business object corresponding to a first sales order and second sales order data from a second business object corresponding to a second sales order, wherein the first data and the second data are a same type of sales order data content;
creating a compare table to enable a comparison of the first sales order data to the second sales order data;
generating a single user interface to include the compare table, a first data field, and a second data field, wherein the first data field and the second data field have a same context on the generated single user interface, and wherein the same context comprises having the first data field and the second data field adjacent to each other in the generated single user interface to enable the comparison;
inserting the first sales order data into the first data field and the second sales order data into the second data field to further enable the comparison; and
configuring the generated single user interface to allow at least one change to be made, based on the comparison, to the first sales order data and the second sales order data while in the same context.

11. The method of claim 10, wherein the same context comprises structuring the single user interface to present the first data field and the second data field in a manner similar to another user interface presenting the first data field without the second data field.

12. The method of claim 10, wherein the single user interface highlights when there is a difference between the first data field and the second data field presented at the single user interface.

13. The method of claim 10, wherein the first business object comprises a data structure from a software-as-a-service system.

14. The method of claim 10 further comprising:
generating a page including the first and second data fields having the same context to enable comparison of the data.

\* \* \* \* \*